United States Patent Office 3,458,475
Patented July 29, 1969

3,458,475
PROCESS FOR THE PREPARATION OF ORGANIC CARBONIC ACID ESTERS OF POLYHYDROXY COMPOUNDS CONTAINING ISOCYANATO GROUPS
Heinrich Krimm, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed June 10, 1966, Ser. No. 556,570
Claims priority, application Germany, June 15, 1965, F 46,337
Int. Cl. C08g 17/13, 22/10
U.S. Cl. 260—47                    9 Claims

ABSTRACT OF THE DISCLOSURE

A process for preparing polyisocyanato polycarbonates by reacting chloroformic acid esters containing isocyanate groups with polyvalent hydroxy compounds in the presence of agents which bind hydrogen chloride.

---

The invention relates to polyisocyanato polycarbonates and a process for their preparation.

It is known to react the hydrochlorides of amino alcohols at moderate temperatures with phosgene and then further phosgenate the resulting aminoalkyl carbonates in the form of their hydrochlorides at elevated temperatures to produce the corresponding diisocyanato alkyl carbonates. This method can be used only for preparations using amino alcohols but not for those requiring aminophenols since only alcoholic hydroxyl groups will react with phosgene at relatively low temperatures and in the absence of substances which bind hydrogen chloride. Therefore, to prepare carbonic acid esters of aminophenols, dinitrophenol carbonates are reduced to diaminophenyl carbonates and the isocyanate groups are then introduced by phosgenating at elevated temperatures.

Both of these processes are subject to a common disadvantage: A carbonic acid ester diamine or the salt thereof must be subjected to a hot phosgenation whereby, through the simultaneous evolution of hydrogen chloride under the rigorous phosgenation conditions, ester cleavage is unavoidable. Another disadvantage inherent in both of these processes is the long reaction time and the occurrence of serious corrosion problems during phosgenation. Further, in some of the methods which have been proposed, all of which require a hot phosgenation, once the isocyanate is finally formed, the elevated temperature often causes it to convert into a resinous material.

It is therefore an object of this invention to provide a method for the preparation of compounds containing isocyanato groups as well as carbonate groups in the same molecule which is devoid of the foregoing disadvantages.

A further object of this invention is to provide a method for the preparation of polyisocyanato polycarbonates which does not require elevated temperatures.

A still further object of this invention is to provide a method for the preparation of polyisocyanato polycarbonates which does not require the preparation and purification of amines and amine salts before a satisfactory starting material can be obtained for the preparation of the desired product.

Another object of this invention is to provide a method for the preparation of polyisocyanato polycarbonates which requires such mild reaction conditions that side reactions cannot occur.

Yet another object of this invention is to provide an improved process for the preparation of materials particularly well-suited for use in the preparation of polyurethanes, including foams, coatings, elastomers, films, fibers and so on.

Still another object of the invention is to provide unique polyisocyanate containing carbonate groupings.

The foregoing objects and others which will become apparent from the following description are accomplished in accordance with this invention, generally speaking, by providing a method for the preparation of polyisocyanato polycarbonates from the reaction between a chloroformic acid ester isocyanate with an organic compound containing at least two hydroxyl groups in an inert solvent in the presence of a hydrogen chloride binding agent.

The smooth course of the reaction is surprising since isocyanates are extremely sensitive to hydroxyl groups with which they react readily, especially in the presence of basic catalysts and form urethane linkages. One would therefore expect a polyaddition reaction to take place with the formation of higher molecular weight products by the reaction between the isocyanate groups and the hydroxyl groups when the reaction is carried out. That such is not in fact the case in the process of this invention is remarkable indeed. Even further, that polyisocyanato polycarbonates can be prepared at low temperatures without side reactions or polymerization at very high yields is even more remarkable.

The chloroformic acid ester isocyanates which are suitable starting materials in the process of this invention are, for example, compounds of the following general formula

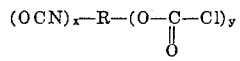

in which $x$ and $y$ are integers of from 1 to 3 and R denotes a hydrocarbon radical such as, for example, a divalent aliphatic, cycloaliphatic, aromatic or araliphatic hydrocarbon radical, or mixtures of these as in an arylalkylaryl type radical. In particular R may be the divalent radical of a branched or unbranched alkane, preferably having 2 to 6 carbon atoms, or the divalent radical of an aromatic hydrocarbon such as benzene, naphthalene or diphenyl, which may be substituted by alkyl radicals. The radical NCO and the radical

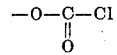

may be linked to the aromatic compound either directly or through an alkyl radical. Preferably, the hydrocarbon radical R is an aromatic or aliphatic radical containing up to about 30 carbon atoms. Further, the substituent R may contain other radicals which are inert to the reaction such as, for example, halogen atoms such as chlorine and bromine and the like.

The following are some specific examples of some suitable chloroformic acid ester isocyanates:

2-isocyanato-ethyl-chloroformic acid ester,
3-isocyanato-propyl-chloroformic acid ester,
4-isocyanato-benzyl-chloroformic acid ester,
4-isocyanato-phenylethyl-2'-chloroformic acid ester,
isopropylidene-phenyl-4-isocyanato-phenyl-4'-
 hydroxyethyl-chloroformic acid ester,
3-isocyanato-phenyl-chloroformic acid ester,
4-isocyanato-2-methylphenyl-chloroformic acid ester,
4-isocyanato-2-methylphenyl-chloroformic acid ester,
3-isocyanato-4-methylphenyl-chloroformic acid ester,
4-isocyanato-naphthyl-1-chloroformic acid ester,
4-isocyanato-naphthyl-1-chloroformic acid ester,
5-isocyanato-naphthyl-1-chloroformic acid ester,
5-isocyanato-naphthyl-2-chloroformic acid ester,
8-isocyanato-naphthyl-2-chloroformic acid ester,
4-isocyanato-diphenyl-4'-chloroformic acid ester, 4-isocyanato-diphenylmethane-4'-chloroformic acid ester,
4-isocyanato-diphenylmethane-3'-chloroformic acid ester,
isopropylidene-4-isocyanato-phenyl-phenyl-4'-chloroformic acid ester,
isopropylidene-4-isocyanato-2-methyl-phenyl-phenyl-4'-chloroformic acid ester,
isopropylidene-4-isocyanato-3-methyl-phenyl-4'-chloroformic acid ester,
isopropylidene-4-isocyanato-3-chloro-phenyl-phenyl-4'-chloroformic acid ester,
isopropylidene-3,4-isocyanato-3-dimethyl-phenyl-phenyl-4'-chloroformic acid ester,
isopropylidene-4-isocyanato-phenyl-phenyl-3,5-dichlorophenyl-phenyl-4'-chloroformic acid ester,
isopropylidene-2-isocyanato-5-methyl-phenyl-phenyl-4'-chloroformic acid ester,
isopropylidene-4-isocyanato-phenyl-phenyl-2'-chloroformic acid ester,
isopropylidene-2,4-diisocyanato-phenyl-phenyl-4'-chloroformic acid ester,
isobutylidene-4-isocyanato-phenyl-phenyl-4'-chloroformic acid ester,
cyclohexylidene-4-isocyanato-phenyl-phenyl-4'-chloroformic acid ester,
methylbenzylidene-4-isocyanato-phenyl-phenyl-4'-chloroformic acid ester and
3-(4'-isocyanato-phenyl)-1,1,3-trimethylindan-5-chloroformic acid ester and the like.

The chloroformic acid ester isocyanates to be used in this invention as starting materials may be prepared, for example, by the reaction between a primary amino alcohol or phenol of the formula $(H_2N)_m$—R—OH with excess phosgene in the presence of a tertiary amine and, if desired, in the presence of a solvent. In the formula R is a divalent substituted or unsubstituted aliphatic, cycloaliphatic, or aromatic group and $m$ is an integer of from 1 to 2. The reaction results in the conversion of the primary amino groups into isocyanate groups and the primary hydroxyl groups into chloroformic acid ester radicals.

Some suitable primary amino alcohols or phenols which may be used in the preparation of the chloroformic acid ester isocyanates are, for example, aminoethanol,
3-aminopropanol,
2-aminobutanol,
2-amino-2-methyl-propanol,
4-aminobenzyl alcohol,
4-aminophenyl-ethyl alcohol,
2,2-(4-amino-4-hydroxyethoxy-diphenyl)-propane, and further, amino-phenols such as o-, m- and p-aminophenol,
3-amino-o-cresol,
4-amino-o-cresol,
5-amino-o-cresol,
4-amino-m-cresol,
6-amino-m-cresol,
2-amino-p-cresol,
3-amino-p-cresol,
2-chloro-4-aminophenol,
5-chloro-2-aminophenol,
2-aminonaphthol-1,
4-aminonaphthol-1,
5-aminonaphthol-1,
6-aminonaphthol-1,
8-aminonaphthol-2,
1-aminonaphthol-2,
3-amino-naphthol-2,
5-aminonaphthol-2,
7-aminonaphthol-2,
8-aminonaphthol-2,
4-amino-4'-hydroxydiphenyl,
4-amino-4'-hydroxydiphenylmethane,
4-amino-3'-hydroxydiphenylmethane,
2,2-(4-amino-4'-hydroxydiphenyl)-propane,
2,2-(4-amino-4'-hydroxy-2-methyldiphenyl)-propane,
2,2-(4-amino-4'-hydroxy-3-methyldiphenyl)-propane,
2,2-(4-amino-4'-hydroxy-3-chlorodiphenyl)-propane,
2,2-(4-amino-4'-hydroxy-3,3-dimethyldiphenyl)-propane,
2,2-(4-amino-4'-hydroxy-3,5-dichloro-diphenyl)-propane,
2,2-(2-amino-4'-hydroxy-5-methyl-diphenyl)-propane,
2,2-(4-amino-2'-hydroxy-diphenyl)-propane,
2,2-(4-amino-2',4'-dihydroxy-diphenyl)-propane,
2,2-(2,4-diamino-4-hydroxy-diphenyl)-propane,
2,2-(4-amino-4'-hydroxy-diphenyl)-butane,
1,1-(4-amino-4'-hydroxy-diphenyl)-cyclohexane,
1,1,1,-(4-amino-4'-hydroxy-triphenyl)-ethane and
3-(4'-aminophenyl)-5-hydroxy-1,1,3-trimethylidane.

The catalytic agents suitable for the preparation of the chloroformic acid ester isocyanates are the tertiary amines such as, for example, trimethylamine, triethylamine, tributylamine, N,N-dimethyl cyclohexyl amine, N,N-dimethyl benzylamine, pyridine, quinoline and the like and mixtures thereof, but, in particular, N,N-dimethyl aniline and/or N,N-diethyl aniline.

Although a solvent is not required, it is preferred that the reaction be carried out in the presence of an inert solvent such as, for example, hydrocarbons such as benzene, toluene, and xylene, chlorinated hydrocarbons such as methylene chloride, chloroform, carbon tetrachloride, ethylene chloride, chlorobenzene, dichlorobenzene, chlorotoluene, dichlorotoluene, trichlorotoluene and chloronaphthalenes and esters such as ethyl acetate, propyl acetate and butyl acetate and the like.

One particularly suitable embodiment comprises dissolving carbonyl dihalide in an inert medium such as, for example, toluene, xylene, tetrahydronaphthalene, benzene, chlorinated aromatic solvents and hydrogenated aromatic hydrocarbons and the like and then adding a solution or suspension of a primary amino alcohol or phenol in a second quantity of the same medium dropwise. A tertiary amine is added to the reaction mixture along with the amino alcohol or phenol at the same rate as it is being used up in the reaction. The temperature of the reaction mixture during the addition of the primary hydroxyl amine is maintained in the range of from about $-10°$ C. to about 50° C., preferably from about $-10°$ C. to about 30° C. After the addition is complete, the temperature of the reaction mixture is elevated to about the reflux temperature of the inert medium, generally not much above about 150° C. The excess carbonyl dihalide is removed under vacuum, and the tertiary amine hydrohalide is removed by washing with ice water. The reaction product is then separated from the solution by the conventional purification techniques such as distillation, crystallization and the like.

In an alternative procedure, the solution or suspension of the primary amino alcohol or phenol is passed into the carbonyl dihalide solution at the reaction temperature together with the tertiary amine.

Generally, it is necessary to heat the reaction mixture to a temperature of about 150° C. or higher in order to complete the reaction. On completion of the reaction, the hydrohalide of the tertiary base, which is formed as a secondary product, is removed by successive washings with ice water. The reaction product is recovered from the solution by first concentrating the solution by evaporation or the like, followed by recrystallization or distillation.

In order to avoid condensation reactions, it is necessary to use an excess of carbonyl dihalide. In cases where the tertiary base is added dropwise, a small excess, in the region of from 5 to 50 percent, i.e. 1.05 to 1.5 mols of carbonyl dihalide per hydroxyl- or amino group, is generally sufficient.

Generally exactly two mols of tertiary amine per amino group and one mol of tertiary amine per hydroxyl group are used. If an excess of tertiary amine is used, it will give rise to a number of secondary reactions with excess carbonyl dihalide, particularly at elevated temperatures and will result in the formation of alkyl halides from aliphatic tertiary amines or nuclear acylation. In addition, an excess of tertiary amines may even give rise to the formation of dyes, especially in cases where aromatic tertiary amines are used.

Although reaction temperatures up to about 150° C. have been found desirable, temperatures below and above this range can be utilized. The particular temperature employed will be dependent in part upon the particular amino alcohol and solvent used. The optimum temperature at the beginning of the reaction may be in the range of from about −10° C. to about 30° C. After the tertiary amine has been added, the temperature may be increased to the point at which the solvent begins to reflux, but generally not beyond about 150° C.

In the process according to the invention for the preparation of polyisocyanato polycarbonates from the chloroformic acid esters prepared as outlined above, the chloroformic acid esters are reacted in an inert solvent in the presence of a hydrogen chloride binding agent with an organic compound containing at least two hydroxyl groups.

Any suitable polyhydroxy compound may be reacted with the chloroformic acid esters such as, for example, polyvalent phenols including resorcinol, hydroquinone, 4,4′-dihydroxy diphenyl, 4,4′-dihydroxydiphenyl methane, 2,2-(4,4′-dihydroxydiphenyl)-propane, 1,1 - (4,4′ - dihydroxydiphenyl)-cyclohexane, 2,2-(4-hydroxy-3,5-dichlorophenyl) propane, 1,1,1-(4,4′-dihydroxy-triphenyl)-ethane, phloroglucine, 3,3′,4,4′ - tetrahydroxy diphenyl propane, tri-(2,2-(4-hydroxyphenyl)-cyclohexane, a,a′ - bis(p-hydroxyphenyl) - a,a,a′,a′ - tetramethyl-m-xylene, 1,1,3-trimethyl-5-hydroxy-3-(4-hydroxyphenyl)-indane, any of the dihydroxynaphthalenes such as, for example, 1,5-dihydroxynaphthalene, hydroxyhydroquinone, 2,4 - (2,4,4′-trihydroxydiphenyl)-propane, 2,2-bis(4 - hydroxyphenylisopropylidene)phenol, 2,4,6 - tri-(4-hydroxyphenyl)-2,4-dimethyl heptane-5, 2′,4′,7 - trihydroxy - 2,4,4-trimethyl flavan and the like; aliphatic polyhydroxy compounds, in particular polyhydric aliphatic alcohols such as ethylene glycol, 1,2-propane diol, 1,3-propane diol, 2-chloro-1,3-propane diol, 1,3-butane diol, 1,4-butane diol, 1,6-hexane diol, 2,5-hexane diol, 2,5-dimethyl-2,5-hexane diol, 2,2-bis-(4′-hydroxyethoxyphenyl)-propane, 1,7-heptane diol, 1,8-octane diol, glycerin, pentaerythritol, neopentyl glycol, quinitol, 1,2,5,6-hexane tetrol, trimethylol propane; cycloaliphatic polyhydroxy compounds such as 1,4-cyclohexane diol, 1,3,5-cyclohexane triol, 2,2-(4,4′-dihydroxydicyclohexyl)-propane, 4,4′-dihydroxydicyclohexyl methane and the like; araliphatic polyols such as m-xylylene glycol, p-xylylene glycol and the like and mixtures of any of the foregoing and the like compounds.

In the process of this invention, any suitable solvent which is inert to the reactants and the reaction product may be employed. Preferably, aliphatic ethers and chlorinated hydrocarbons are used including, for example, dimethyl ether, diethyl ether, dipropyl ether, 2,2′-dichlorodiethyl ether, 1,1,1,3-tetrachlorotetrafluoropropane, 1,1,1-trichloropentafluoropropane, 1,1,1 - dichlorofluoro-2,2,2-chlorodifluoroethane, dibromotetrafluoroethane, 1,1,1-dichlorofluoro - 2,2,2 - dichlorofluoroethane, carbon tetrachloride, trichloroethylene, chloroform, methylene chloride, bromobenzene, ethylene dichloride, ethylene bromide, chlorobenzene, dichlorobenzene, propylene dichloride, butyl chloride, perchloroethylene, trichlorofluoromethane and the like and mixtures thereof, benzene, toluene, xylene, chlorobenzene, dichlorobenzene, nitrobenzene, dinitrobenzene, aliphatic technical mixtures of petroleum fractions, ethyl acetate, ethyl propionate and similar aromatic hydrocarbons, aliphatic hydrocarbons petroleum solvents and esters and the like, as well as any suitable tertiary amine mentioned below as a binding agent or catalyst and the like mixtures of any of the foregoing and the like solvents.

The hydrogen chloride binding agent to be used in the practice of this invention is preferably a tertiary amine although any other suitable agent which will perform the same function may also be used. Any alkaline or alkaline earth metal hydroxide can be employed, such as sodium hydroxide, potassium hydroxide, lithium hydroxide, calcium hydroxide, strontium hydroxide, barium hydroxide and the like or mixtures thereof. Any tertiary amine may be used such as, for example, triethylamine, tributylamine, N,N-dimethylcyclohexylamine, N,N-dimethylbenzylamine, N,N-dimethylaniline, dimethyl amino propyl acetamide, dimethyl benzylamine, pyridine, quinoline, N - methylmorpholine and N-methyl-decahydroquinoline, N-ethylmorpholine, triethylene diamine and the like, and mixtures thereof. The tertiary amines may also act as catalysts and if they are so used, they are preferably employed in concentrations of from about 1.0 to about 500 mg. per liter of the total reaction mixture.

The reaction of this invention may be carried out at any suitable temperature with the preferred range for the preparation of the polyisocyanato polycarbonates of this invention being between about −20° C. and about +20° C., but most preferably between about −5° and +5° C.

The basic process of the invention may be carried out successfully in various embodiments which complement each other with respect to the starting materials to be used. In any case, it is essential that a hydrogen chloride binding agent be present in the reaction mixture in at least stoichiometric quantities to remove all of the hydrogen chloride formed. The best binding agents are tertiary amines and alkali or alkaline earth hydroxides. Further, as has already been pointed out, the tertiary amines may act as catalysts for the reaction in addition to their hydrogen chloride binding effect.

The process of the invention may be carried out, for example, in a two-phase system consisting of a solvent layer and an aqueous layer, in which case the aqueous layer has the hydrogen chloride binding agent dissolved in it. In such an instance, the hydrogen chloride binding agent is normally an alkali or alkaline earth hydroxide because of the water solubility of such materials, and it is preferred but not necessary to have a tertiary amine present in the organic layer to catalyze the reaction. As aforesaid, if the tertiary amine acts solely in a catalytic capacity, it need only be present in a catalytic quantity, and any suitable tertiary amine may be used including those mentioned hereinbefore as hydrogen chloride binding agents.

In the two-phase system, the chloroformic acid ester isocyanate is reacted in a suitable inert solvent with a solution or suspension of the polyhydroxy compound in dilute aqueous alkali at the reaction temperature with small quantities of tertiary amine as a catalyst. The reaction is terminated as soon as the consumption of aqueous alkaline hydroxide has reached its highest value. This method is particularly suitable for the reaction of polyvalent phenols in the preparation of the polyisocyanato polycarbonates of this invention.

In another embodiment the polyhydroxy compound is reacted with the chloroformic acid ester isocyanate in a homogeneous phase in the presence of at least stoichiometric quantities of a tertiary amine as an agent for binding hydrogen chloride. In this embodiment, the tertiary amine can also serve as the solvent, or a suitable inert solvent can be used in conjunction with it.

Further, the alkali metal or alkaline earth metal salt of the polyvalent hydroxy compound suspended in an anhydrous inert solvent may be reacted, if desired in the presence of a tertiary amine catalyst, with the chloroformic acid ester isocyanate. In this embodiment, alkali metal chlorides are formed as the reaction proceeds.

The organic compound containing at least two hydroxyl groups and the chloroformic acid ester may be used in any proportion to one another depending on the product desired, but they are preferably used in exactly stoichiometric quantities; that is, one equivalent of chloroformic acid ester is used per equivalent of the polyol to be reacted. Although at least a stoichiometric quantity of the hydrogen chloride binding agent is required, it is also possible in most cases to use an unlimited excess if desired.

When the reaction is terminated, the salts formed during the reaction are removed from the solutions of reaction products by suction filtration and/or washing with ice water, and any tertiary amine present in the solution is removed by washing with a cold dilute acid, preferably hydrochloric acid.

action mixture is then stirred for about another 5 minutes. The layers are separated, the product shaken once with ice water with the addition of about 20 ml. of about 2 N acetic acid and once again with ice water, rapidly dried over sodium sulphate and the solvent is then distilled off. The remainder of the solvent is removed by heating at about 200° C. under about 14 mm. Hg. After cooling, about 760 parts of a pale resin is obtained which has an isocyanate number of about 10.2%; calculated 10.7%. The yield is about 96.5% of theoretical.

The content of saponifiable chlorine is about 0.02%. The compound has the following formula:

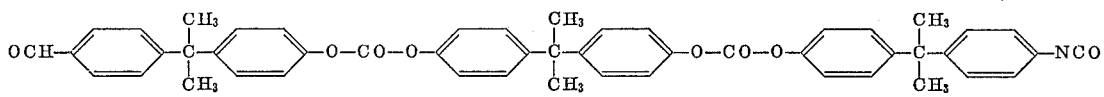

The products of the process are obtained from the carefully dried solutions as almost colorless soft or hard resins which generally can no longer be distilled and which in some cases, solidify into crystals upon cooling.

The polyisocyanato polycarbonates of this invention are valuable as intermediate products and may be used in the production of synthetic resins. Particularly, the polyisocyanato polycarbonates are valuable as reactants with compounds containing hydrogen atoms which are reactive with NCO groups in the preparation of polyurethanes of all types including coatings, elastomers, films, fibers and, with the addition of a blowing agent in the reaction mixture, foams, and the polyurethanes thus prepared may be used in any application for which they are suitable, such as lacquers, cushions, and so on. Polyurethanes made from the isocyanates of this invention are of special interest since they have combined in them the advantageous properties of recurring carbonate as well as urethane linkages.

The invention is further illustrated by the following examples by which all parts and percentages are by weight unless otherwise specified.

Example 1

After the addition of about 600 ml. of methylene chloride and about 10 drops of dimethylcyclohexylamine to a solution of about 228 parts (1 mol) of 2,2-(4'-hydroxyphenyl)-propane in about 1.25 liters of about 2 N sodium hydroxide (2.5 mols), a solution of about 631 parts (2 mols) of isopropylidene-4-isocyanate-phenyl-phenyl-4'-chloroformic acid ester in about 1 liter of methylene chloride is added dropwise at about 0° C. within about 20 minutes while cooling with a freezing mixture, and the re- Example 2

A solution of about 134 parts (0.5 mol) of 1,1-(4'-hydroxyphenyl)-cyclohexane in about 625 ml. of about 2 N sodium hydroxide solution (1.25 mols), about 1.25 liters of ice water, about 500 ml. of methylene chloride and about 10 drops of dimethylbenzylamine is reacted as in Example 1 with a solution of about 315.5 parts (1 mol) of isopropylidene-4-isocyanato-phenyl-phenyl-4'-chloroformic acid ester in about 500 ml. of methylene chloride. About 400 parts of a pale resin are obtained. The isocyanate number is about 9.6%; calculated 10.2%. The total chlorine is about 0.01%. The yield is about 96.8% of theoretical.

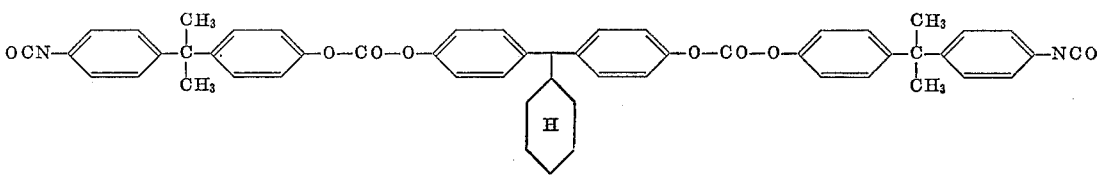

Example 3

A solution of about 268 parts (0.67 mol) of 2,4,6-tri-(4'-hydroxyphenyl)-2,2-dimethyl-heptene-5 in about 1250 ml. of about 2 N sodium hydroxide solution (2.5 mol), about 1 liter of methylene chloride and about 10 drops of dimethylcyclohexylamine is reacted as in Example 1 with a solution of about 631 parts (2 mols) of isopropylidene-4-isocyanato-phenyl-phenyl-4'-chloroformic acid ester in about 1 liter of methylene chloride. About 780 parts of a pale resin are obtained which has an isocyanate number of about 9.4%; calculated about 10.2%. Yield: 95% of theoretical.

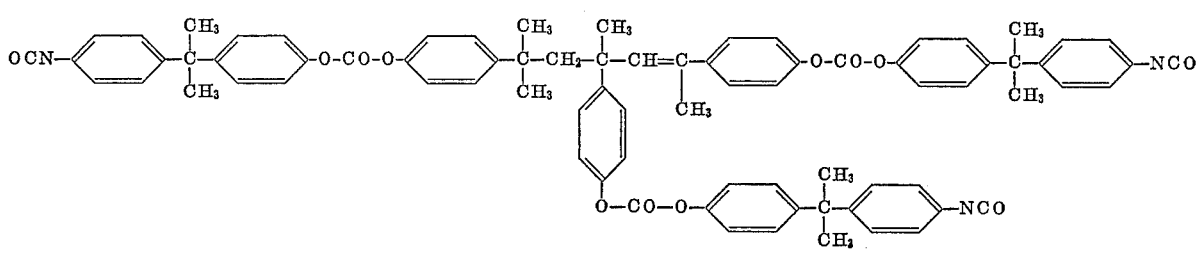

Example 4

A solution in about 125 ml. of 2 N aqueous sodium hydroxide (0.25 mol) of about 74 parts (0.1 mol) of tribisphenol dicarbonate prepared from 2,2-bis-(4'-hydroxyphenyl)-propane, about 200 ml. of methylene chloride and about 1 drop of triethylamine is reacted as in Example 1 over about one hour with a solution of about 63 parts (0.2 mol) of isopropylidene-4-isocyanatophenyl-phenyl-4'-chloroformic acid ester in about 100 ml. of methylene chloride. About 122 parts of a brownish resin are obtained. The isocyanate number is about 6.2%; calculated 6.5%. The yield is about 94% of theoretical.

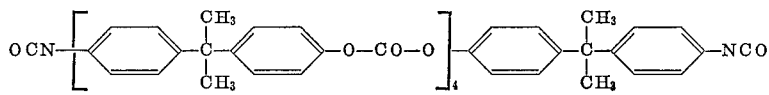

Example 5

A solution of about 11.8 parts (0.1 mol) 1,6-hexanediol in about 125 ml. of about 2 N aqueous sodium hydroxide (0.25 mol), about 100 ml. of methylene chloride and about 2 drops of dimethylcyclohexylamine is reacted as in Example 1 with a solution of about 63 parts (0.2 mol) of isopropylidene-4-isocyanato-phenyl-phenyl-4'-chloroformic acid ester in about 100 ml. of methylene chloride within about 50 minutes at about −5° C. and the reaction is then left to proceed for about a further 40 minutes. About 63 parts of a pale resin are obtained. The isocyanate number is about 12.2%; calculated 12.4%. The yield is about 93% of theoretical.

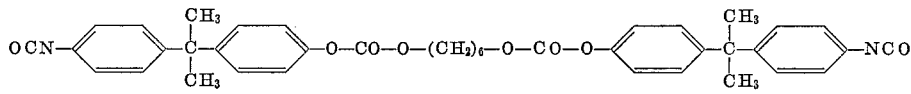

Example 6

A solution of about 63 parts (0.2 mol) of isopropylidene-4-isocyanato-phenyl - 4' - chloroformic acid ester in about 100 ml. of methylene chloride and a solution of about 24.2 parts (0.2 mol) of dimethylaniline in about 50 ml. of methylene chloride are simultaneously added dropwise at about 0° C. with cooling over about a 20 minute period into a solution of about 31.6 parts (0.1 mol) of 2,2-bis-(4'-hydroxyethoxyphenyl)-propane in about 500 ml. of methylene chloride, and the reaction mixture is then stirred for about a further 15 minutes and the temperature allowed to rise to about 20° C. in the course of about another hour. The reaction mixture is then cooled to about 0° C., shaken twice with ice water, dried over sodium sulphate and the solvent is then distilled off in the final stage at about 190° C. under about 15 mm. Hg. A hard resin with a blue tinge is obtained. The isocyanate number is about 9.0%; calculated 9.63%. The yield is about 86 grams; 98.5% of theoretical.

where $x$ and $y$ are integers of from 1 to 3 and R denotes a hydrocarbon radical, with an organic compound containing at least two hydroxy groups at a temperature of from −20° C. to about +20° C., in an inert solvent in the presence of at least a stoichiometric amount of a hydrogen chloride binding agent wherein the reaction takes place substantially exclusively between the chloroformic acid ester groups and the hydroxyl groups of the organic compound.

2. The method of claim 1 wherein the hydrogen chloride binding agent is selected from the group consisting of an alkali metal hydroxide, an alkaline earth metal hydroxide and a tertiary amine.

3. The process of claim 1 wherein the chloroformic acid ester has from 1 to 30 carbon atoms in the ester grouping.

4. The method of claim 1 wherein a tertiary amine catalyzes the reaction.

5. The process of claim 1 wherein the reaction is carried out in a two phase system in which the chloroformic acid ester is reacted in a solvent inert to the reactants and reaction product with the polyhydric compound in the aqueous layer having the hydrogen chloride binding agent dissolved therein.

6. The process of claim 1 wherein the reaction takes place in a homogeneous phase.

7. The process of claim 1 wherein the hydrogen chloride binding agent is an alkali metal hydroxide or an alkaline earth metal hydroxide and the binding agent is first reacted with the polyhydric compound to form a salt thereof.

8. The method of claim 1 wherein the chloroformic acid ester containing isocyanato groups is reacted with a stoichiometric equivalent quantity of the organic compound containing at least two hydroxyl groups.

9. The method of claim 8 wherein the temperature is from about −5° C. to about +5° C.

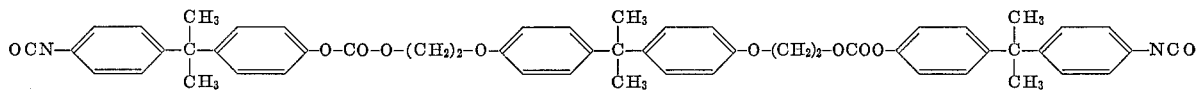

It is to be understood that any of the components mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A method for the preparation of polyisocyanato polycarbonates which comprises reacting a chloroformic acid ester containing isocyanato groups, and having the formula

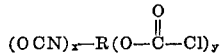

References Cited

UNITED STATES PATENTS 3,322,812   5/1967   Brotherton et al. _____ 260—77.5

MURRAY TILLMAN, Primary Examiner

P. LIEBERMAN, Assistant Examiner

U.S. Cl. X.R.

260—2.5, 77.5, 463, 858